(12) United States Patent
Zhao et al.

(10) Patent No.: US 7,859,265 B2
(45) Date of Patent: Dec. 28, 2010

(54) ONE ROW WAVELET SENSOR LAYOUT FOR RESISTIVITY IMAGING

(75) Inventors: Jinsong Zhao, Sugarland, TX (US); Jorge O. Maxit, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 484 days.

(21) Appl. No.: 11/769,300

(22) Filed: Jun. 27, 2007

(65) Prior Publication Data

US 2009/0001989 A1     Jan. 1, 2009

(51) Int. Cl.
*G01V 3/20* (2006.01)

(52) U.S. Cl. ..................................... 324/355

(58) Field of Classification Search ........................ None
See application file for complete search history.

(56) References Cited

U.S. PATENT DOCUMENTS

| | | | |
|---|---|---|---|
| 3,065,405 A * | 11/1962 | Jarrett | 324/373 |
| 4,259,728 A * | 3/1981 | Geary et al. | 365/45 |
| 4,468,623 A * | 8/1984 | Gianzero et al. | 324/367 |
| 4,618,828 A * | 10/1986 | Raynal | 324/347 |
| 5,629,517 A | 5/1997 | Jackson et al. | |
| 6,568,486 B1 * | 5/2003 | George | 175/45 |
| 6,711,502 B2 * | 3/2004 | Mollison et al. | 702/6 |
| 6,794,875 B2 * | 9/2004 | Strickland | 324/343 |
| 7,034,538 B2 * | 4/2006 | Strack et al. | 324/347 |
| 2008/0252608 A1 * | 10/2008 | Geaghan | 345/173 |
| 2010/0023268 A1 * | 1/2010 | Gold et al. | 702/9 |

FOREIGN PATENT DOCUMENTS

JP        2007102377 A  *  4/2007

OTHER PUBLICATIONS

Schanz, et al. "Smart CMOS Image Sensor Arrays". IEEE Transactions on Electron Devices, vol. 44, No. 10, Oct. 1997. pp. 1699-1705.

* cited by examiner

*Primary Examiner*—Jay M Patidar
(74) *Attorney, Agent, or Firm*—Cantor Colburn LLP

(57) ABSTRACT

A sensor electrode for imaging a formation. The sensor includes a geometry either reduces or substantially limits spatial aliasing in formation data. The aliasing is the result of imaging the formation with an array of the sensor electrodes.

5 Claims, 8 Drawing Sheets

Fig. 1

--PRIOR ART--

Fig. 2A

-- PRIOR ART --

Fig. 2B

-- PRIOR ART --

ONE ROW WAVELET SENSOR LAYOUT FOR RESISTIVITY IMAGING

BACKGROUND OF THE INVENTION

1. Field of the Invention

The invention disclosed herein relates to subterranean imaging and, in particular, to arrangements of electrodes for resistivity imaging within a wellbore.

2. Description of the Related Art

Imaging of formations surrounding boreholes provides valuable information for describing geologic features. Some of the features include structural framework, fracture patterns, sedimentary feature, and in-situ stress orientation. High-resolution borehole images are used as an aid in providing conventional core description and determining orientation. While various technologies are used for imaging, one technology that is particularly useful involves resistivity measurements.

Information obtained by performing resistivity measurements is useful for planning formation testing, sampling, perforating and other such tasks. For thinly laminated turbidite sands and other sequences, these images are often one of the few practical methods for determining net sand and deposit thicknesses.

One instrument for making resistivity measurements is available from Baker Hughes, Incorporated of Houston, Tex. The instrument, referred to as an "Earth Imager," has provided for a variety of resistivity images.

Figure 1:
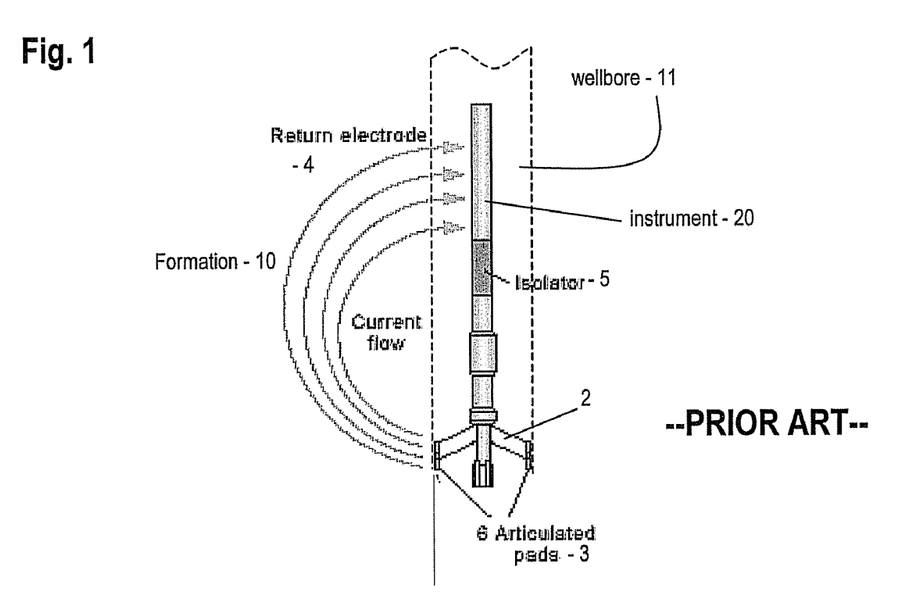
FIG. 1 depicts a prior art instrument for performing resistivity measurements in a wellbore.

Reference may be had to FIG. 1. In FIG. 1, there is shown a depiction of the prior art instrument for performing resistivity imaging. In this example, the instrument 20 is disposed within a wellbore 11. The instrument 20 includes pads 3 mounted on articulating arms 2. The articulated pads 3 are typically pressed up against a wall of the wellbore 11 and make firm contact therewith. Current I flows from the return electrode 4 to the pads 3. The return electrode 4 is electrically separated from each of the pads 3 by an isolator 5.

Figure 2A:
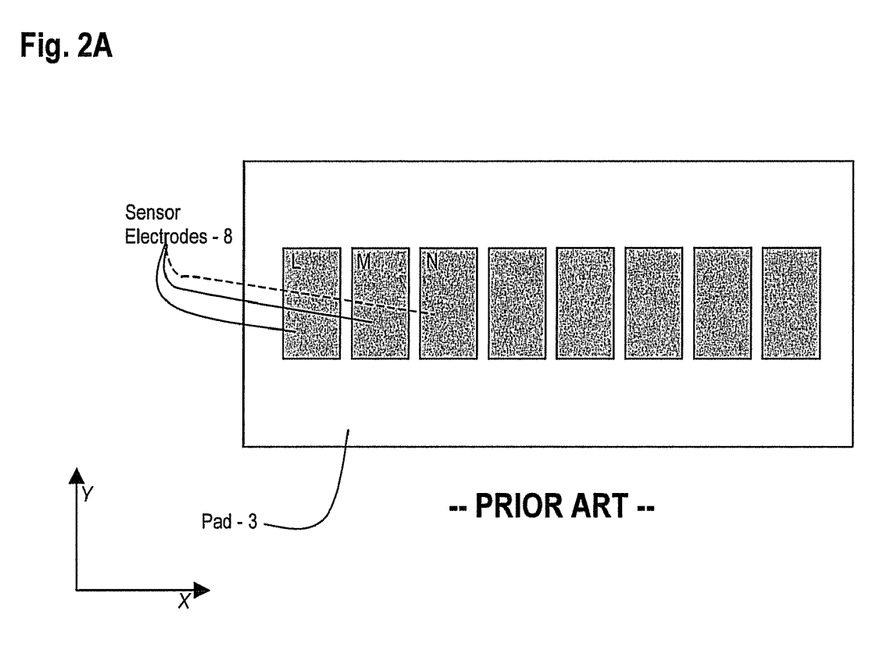
FIG. 2A and FIG. 2B, collectively referred to herein as FIG. 2, illustrate aspects of sensor electrodes for the prior art instrument of FIG. 1.
Figure 2B:
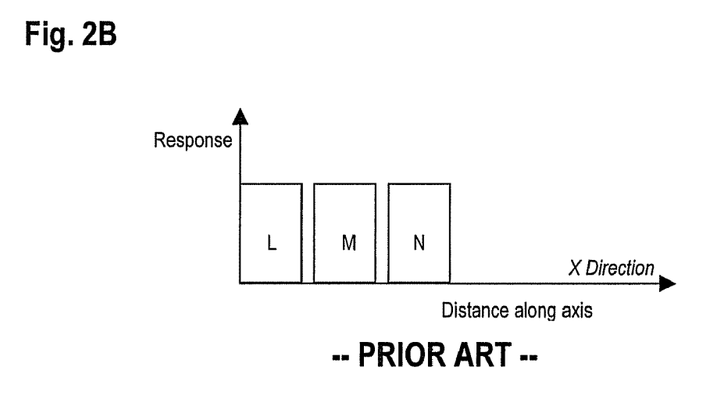

In the prior art instrument, each pad 3 contains a set of eight measuring sensor electrodes surrounded by a metal pad housing which acts as a focusing electrode for the measuring sensor electrodes. FIG. 2 provides a simplified illustration of the prior art pad 3 and sensor electrodes 8 disposed on a face of the pad 3. As shown in FIG. 2A, each of the sensor electrodes 8 has a generally rectangular appearance. As is typically the case, the sensor electrodes 8 are disposed in an array (in this case, the array having eight elements). An exemplary response function for three of the sensor electrodes 8 is provided in FIG. 2B.

During operation of the instrument, current measurement for each measuring sensor electrode 8 is a function of the formation conductivity and the voltage applied. High resolution images are achieved by sampling at a high rate (for example, about 120 samples per foot), using the readings from the forty eight sensor electrodes 8 mounted on the six pads 3.

These measurements are scaled to resistivity values so that they can be correlated with conventional shallow measurements. All forty eight curves acquired are corrected for speed variations and oriented to true North using magnetometer and accelerometer readings from a separate orientation instrument prior being presented as a color scaled resistivity image.

While this instrument produces valuable data, one skilled in the art of data interpretation may recognize certain limitations. For example, in certain conditions, aliasing of data occurs. That is, when a continuous signal is reconstructed from the samples, the result may be one of the aliases, which represents a form of distortion. The term "aliasing" therefore refers to ambiguity created by sampling or the subsequent distortion or both.

Aliasing may arise from a variety of sources. One skilled in the art will recognize that the shape of the sensor electrodes 8 depicted in FIG. 2 is one such source. For example, development of image results for areas between the sensor electrodes 8 may inherently involve aliasing. More specifically, with reference to FIG. 2B, an exemplary response function for the array of sensor electrodes 8 is shown. As there is a portion of the pad 3 between each sensor electrode 8, no data is collected in this area (strictly speaking, and without regard for edge effects and other such phenomena).

In the art of digital imaging, effects from aliasing and other design limitations are known. Various techniques for improved performance have been presented. Reference may be had to the article entitled "Smart CMOS Image Sensor Arrays," by Schanz et al., and published in IEEE transactions on Electron Devices, Vol. 44, No. 10, October 1997. This article discusses, among other things, implementation of smart image sensor arrays.

Therefore, what are needed are designs for sensor electrodes that reduce or eliminate the effect of aliasing on resistivity images.

BRIEF SUMMARY OF THE INVENTION

Disclosed is a sensor electrode for interrogating an earth formation, where the sensor electrode includes: a geometry that reduces spatial aliasing in formation data when the sensor electrode is disposed in array.

Also disclosed is a method for designing a sensor electrode for interrogating an earth formation, the method including: determining a geometry for the sensor electrode; evaluating a response function for the sensor electrode; and adjusting a geometry of the sensor electrode to improve the response function.

Further disclosed is a computer program product stored on machine readable media, the product including machine executable instructions for designing a sensor electrode for interrogating an earth formation, the instructions including instructions for: receiving an input geometry for the sensor electrode; evaluating at least one response function for the sensor electrode; and adjusting the geometry according to desired response for each response function.

An array of sensor electrodes for interrogating an earth formation, the array including sensor electrodes including a one-row wavelet geometry.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Disclosed are anti-aliasing sensor electrodes for resistivity evaluation of earth formations. The sensors presented herein are typically used as a component of an imaging instrument. The imaging instrument is particularly useful for making resistivity measurements when either one of wireline logging and measuring-while-drilling (MWD).

For purposes of the discussion herein, the imaging instrument is used during wireline logging (that is, after drilling). However, one skilled in the art will recognize that this is illustrative and not limiting of the teachings herein. For example, aside from wireline deployment, the device may be deployed using coil tubing, a pipe, a drill string, a tractor, or any other technique that is deemed suitable.

As used herein, the term "anti-aliasing sensor electrodes" makes reference to sensor electrodes (also referred to as "sensors" or "electrodes" herein) that incorporate design features into their geometry for improving sampling and signal reconstruction. Among the improvements are reductions or substantial elimination of aliasing effects incorporated into resistivity imaging results. The sensor electrodes are typically used in an array. As used herein, the term "array" makes reference to two or more sensor electrodes disposed in a relation to each other. As discussed herein, imaging is one use of anti-aliasing sensor electrodes. Other uses, such as those that are known to those skilled in the art, may make use of the anti-aliasing sensor electrodes. Accordingly, the variety of uses are generally considered to make use of the anti-aliasing sensor electrodes for interrogation of the earth formation.

Figure 3:
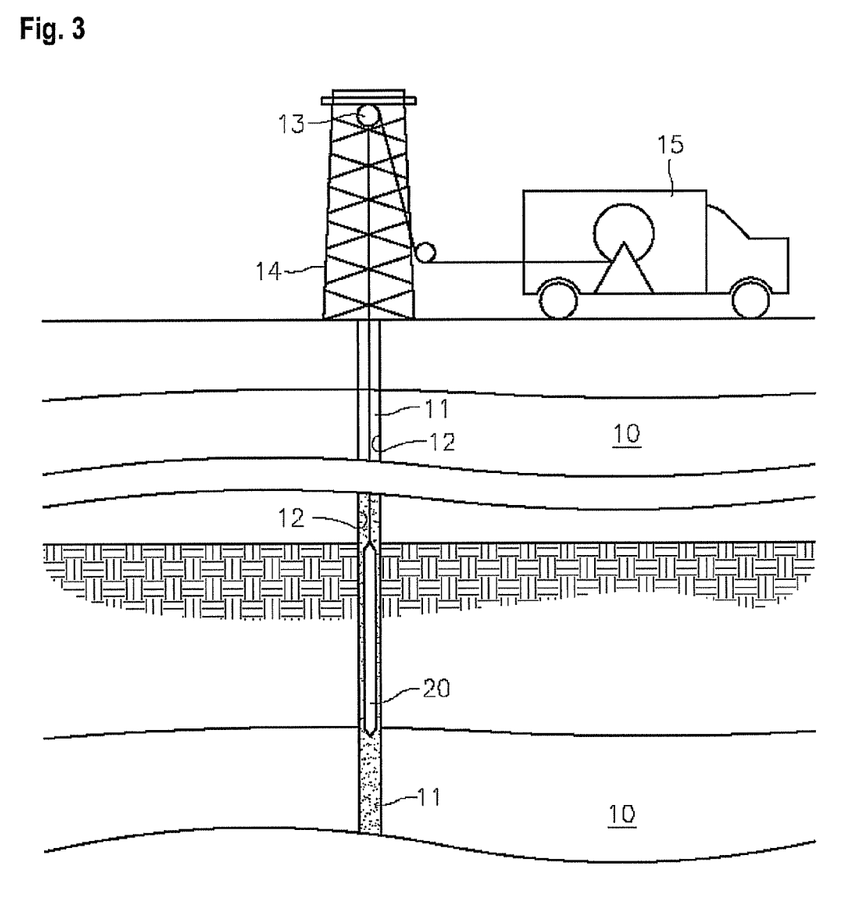
FIG. 3 depicts an exemplary deployment of an instrument deploying sensor electrodes as disclosed herein.

Turning now to FIG. 3, aspects of logging a well using the instrument disclosed herein are depicted therein. In FIG. 3, a cross-section of earth formations 10 along the length of a penetration referred to as a "wellbore" 11 is depicted. Usually, the wellbore 11 is at least partially filled with a mixture of liquids including water, drilling fluid, mud, oil and formation fluids that are indigenous to the formations 10 penetrated by the wellbore 11. Drilling mud may also be introduced into the wellbore 11. In typical embodiments, the drilling mud is a non-conductive or conductive fluid as is known in the art.

Suspended within the wellbore 11 at the bottom end of a wireline 12 is an imaging instrument 20. The wireline 12 is often carried over a pulley 13 supported by a derrick 14. Wireline 12 deployment and retrieval is typically performed by a powered winch carried by a service truck 15.

As is known in the art, at least one of the imaging instrument 20 and the service truck 15 include electronics and support equipment as is needed for operating the imaging instrument 20. Included with the electronics and support equipment is a power supply for providing power to the imaging instrument 20, processing capabilities, data storage, memory and other such components. The power provided to the imaging instrument 20 may be delivered over a broad range of frequencies f, and currents I. Signal analysis may include known techniques for analog signal processing and digital signal processing as appropriate. As these and other aspects are known in the art, such aspects are generally not discussed in greater detail herein.

Typically, a power supply for the anti-aliasing sensors provides alternating current (AC) that is in a relatively high frequency f range (for example, of about 1 MHz to about 10 MHz). However, the sensors may be operated at frequencies above or below this range. For example, the sensors may be operated in ranges from about 100 kHz to 100 MHz. Alternatively, the sensors may be used with direct current (DC) if desired. As operation and other aspects of resistivity instruments are generally known in the art, these topics are discussed further herein only on a limited basis.

Figure 4A:
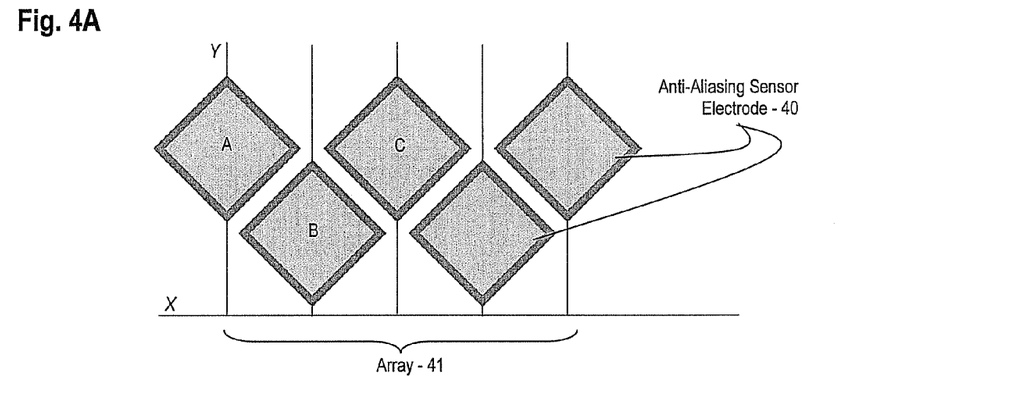
FIG. 4A, FIG. 4B and FIG. 4C, collectively referred to as FIG. 4, depict a first embodiment of an anti-aliasing electrode with associated performance curves.
Figure 4B:
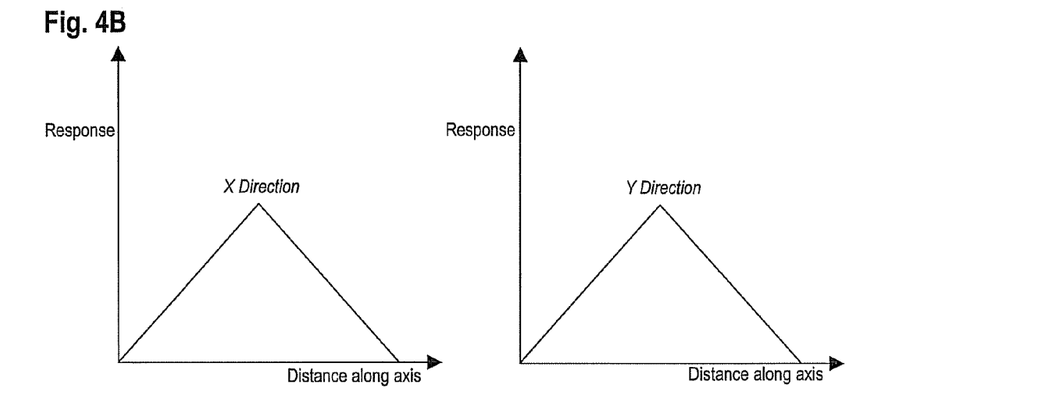

Referring now to FIG. 4, there is shown an exemplary and a non-limiting embodiment of an array of anti-aliasing electrodes. In FIG. 4A, an array 41 of anti-aliasing sensor electrodes 40 is depicted. In FIG. 4B, aspects of performance for the anti-aliasing sensor electrodes 40 is depicted.

It should be recognized that the term "anti-aliasing" is descriptive of one advantage of the sensor electrodes disclosed herein, and is not limiting of the electrodes to embodiments that address aliasing effects. Rather, the term is used merely for convenience and descriptive of one aspect of the teachings provided. In general, as used herein, the terminology regarding abasing makes reference to spatial abasing.

In FIG. 4A, a "diamond" shaped sensor electrode 40 is presented. Response for each electrode is depicted in FIG. 4B. FIG. 4B shows that an X direction response (cross sectional area) is symmetric with a Y direction response (where the coordinate system is with regard to the instrument). However, it has been recognized that two rows of sensor electrodes may provide some complications, such as asymmetrical response in some situations to formation data. Accordingly, further embodiments are provided.

Figure 4C:
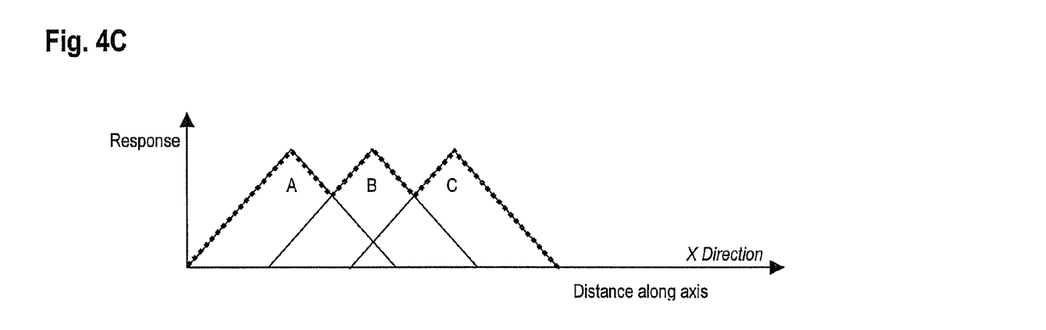

First, it should be noted that the response curves provided in FIGS. 4-8 are directed to a single sensor electrode 40 (with the exception of FIG. 4C). These curves are related to cross sectional area of each respective sensor electrode 40, and do not account for various phenomena (such as edge effects) that might exist within an operational system. FIG. 4C depicts response for a portion of the array 41. In FIG. 4C, response for a first sensor electrode A, a second sensor electrode B, and a third sensor electrode C is depicted. When used together, response for the array 41 is depicted by the dashed curve shown. One skilled in the art will recognize that the anti-aliasing sensor electrodes 40 may be used individually, together, or in various combinations. Accordingly, response functions may vary according to orientation and other factors.

With regard to the performance curves of FIGS. 4 through 8, it should be noted that the performance correlates to a cross sectional area for a respective electrode along a respective axis. The axis selected is one of an X axis and a Y axis of an instrument based coordinate system. One skilled in the art will recognize that as the instrument 20 traverses the formation 10, that a performance curve taken in relation to the formation 10 (i.e., a formation coordinate system) may have a different appearance than that of the instrument based coordinate system.

In the development of anti-aliasing sensor electrodes 40, various embodiments were considered. Some of these embodiments are presented herein. In general, each embodiment of the anti-aliasing sensor electrodes 40 incorporates a design that limits spatial aliasing in at least one of an X-direction and a Y-direction (when considered, for convenience, in the instrument coordinate system).

Figure 5A:
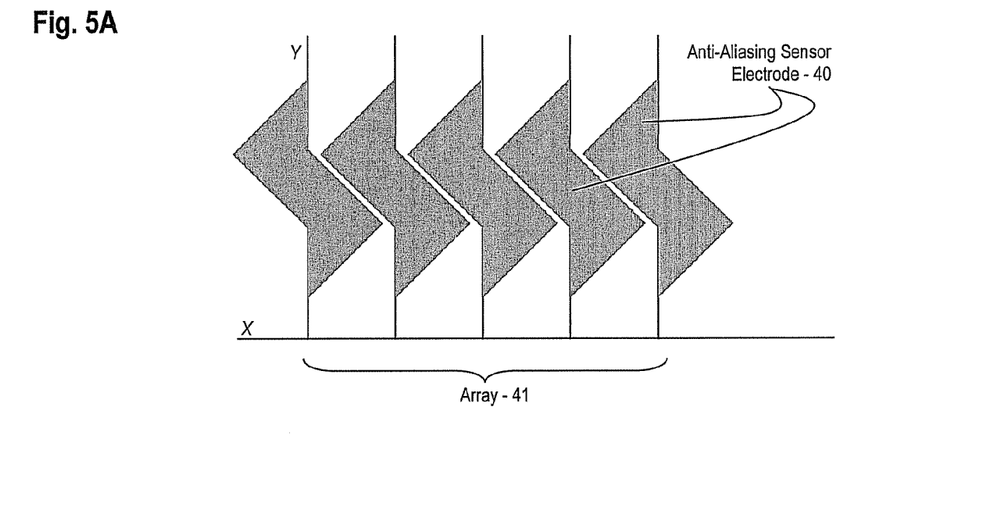
FIG. 5A and FIG. 5B, collectively referred to as FIG. 5, depict a second embodiment of an anti-aliasing electrode with associated performance curves.
Figure 5B:
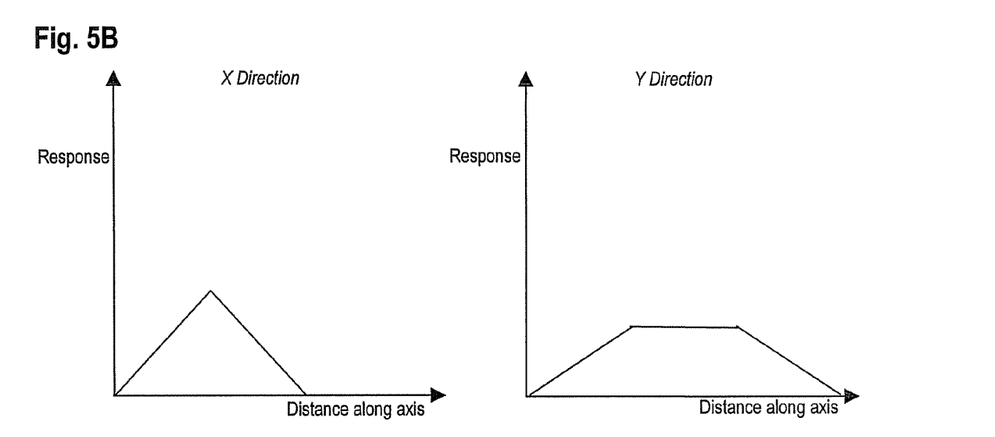

In FIG. 5A, a "one-row zigzag" shaped sensor electrode 40 is presented. Response for each electrode is depicted in FIG. 5B. FIG. 5B shows that the X direction response increases to a maximum, and then decreases at the same rate as the increase. This is the case as the one-row zigzag sensor 40 is symmetric about the X axis. In contrast, the Y direction response increases at a fixed rate until it reaches a plateau where performance is unchanged. Again, after a certain point, performance then decreases at the same rate as the increase. In order to maximize a benefit from the plateau, another embodiment is provided and described with relation to FIG. 6.

Figure 6A:
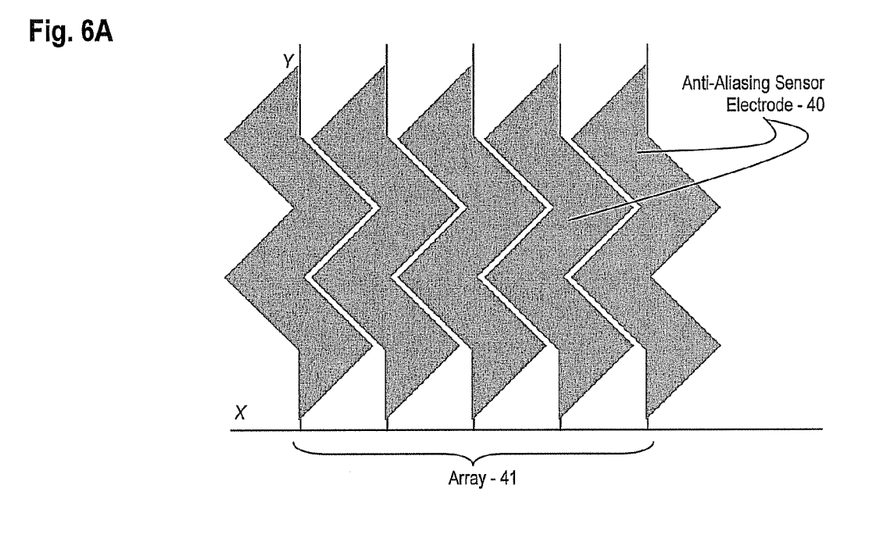
FIG. 6A and FIG. 6B, collectively referred to as FIG. 6, depict a third embodiment of an anti-aliasing electrode with associated performance curves.
Figure 6B:
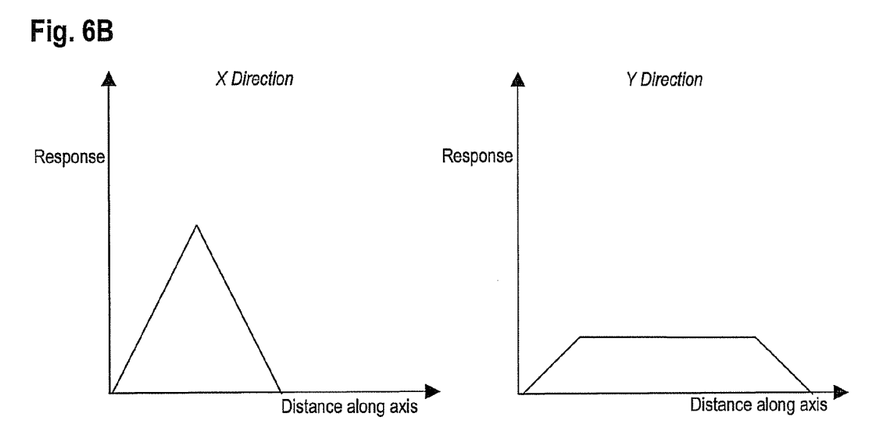

FIG. 6 depicts a "one-row double zigzag" embodiment of the sensor electrode 40. FIG. 6A depicts geometry of the sensor, while FIG. 6B illustrates performance in the X direction and the Y direction. While performance characteristics in the Y direction are desirable, it is preferred to have a better correlation with performance in the X direction (at least in some instances). Accordingly, a further embodiment is provided in FIG. 7.

Figure 7A:
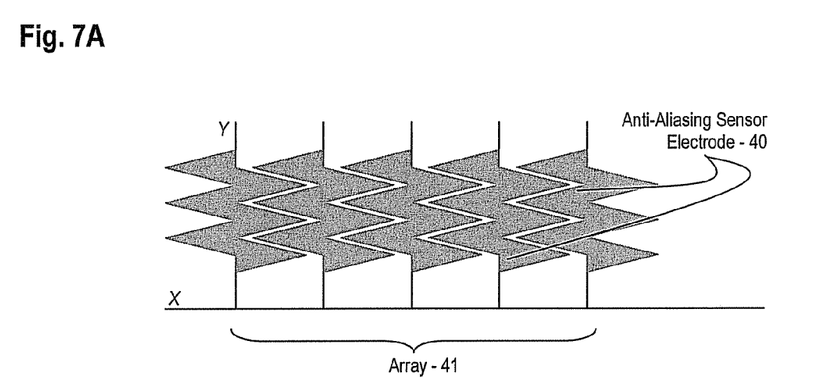
FIG. 7A and FIG. 7B, collectively referred to as FIG. 7, depict a fourth embodiment of an anti-aliasing electrode with associated performance curves.
Figure 7B:
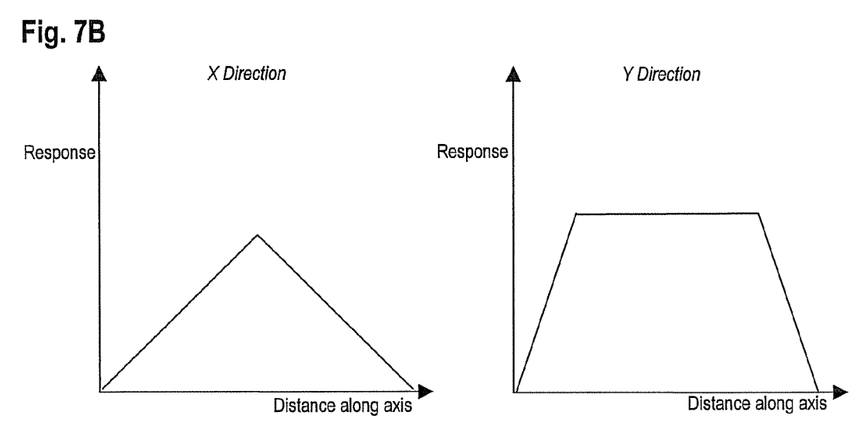

FIG. 7 depicts a "one-row triple zigzag" embodiment of the sensor electrode 40. FIG. 7A depicts geometry of the sensor, while FIG. 7B illustrates performance in the X direction and the Y direction. This embodiment provides a better correlation with performance in the X direction and the Y direction, for at least some instances. Accordingly, another embodiment is provided.

Figure 8A:
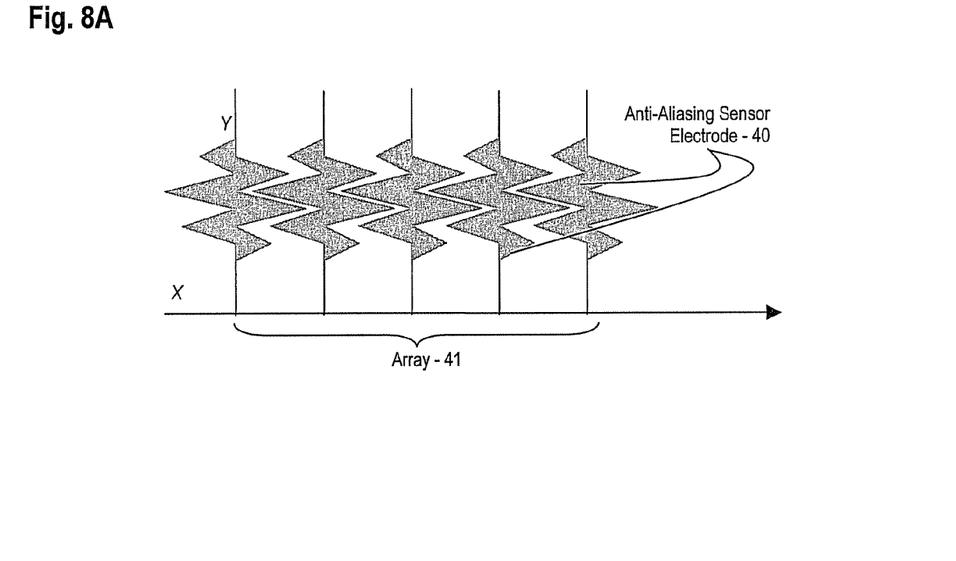
FIG. 8A and FIG. 8B, collectively referred to as FIG. 8, depict a fifth embodiment of an anti-aliasing electrode with associated performance curves.
Figure 8B:
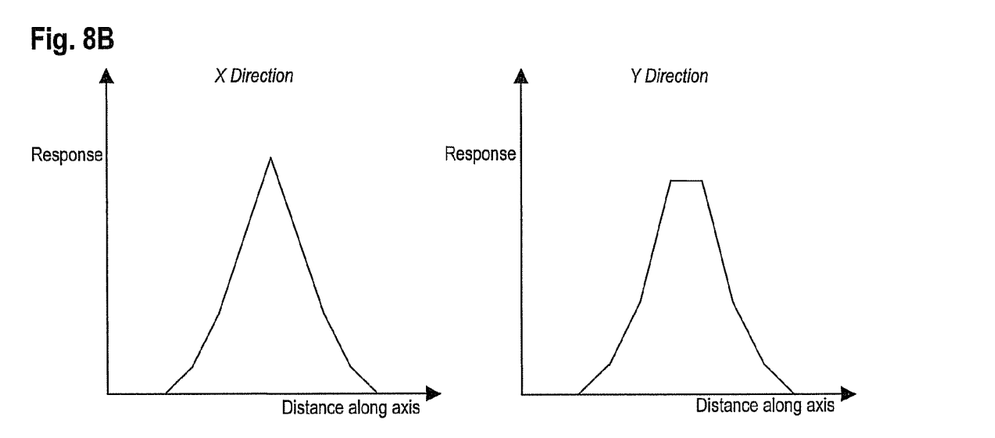

In FIG. 8, an embodiment of the sensor electrode 40 referred to as a "one-row wavelet" sensor electrode 40 is provided. The one-row wavelet sensor incorporates a design have smoothed and tuned edges which provide for improved frequency response. Additionally, the design reduces or substantially eliminates most the angle bias that may be realized in a two-dimensional (2D) sampling system.

One skilled in the art will note that the embodiment depicted in FIG. 8 provides for a high response over a short interval. This is the case in both the X direction and the Y direction. Accordingly, use of sensor electrodes 40 having a shape that is of the one-row wavelet design provides for increased resolution (in each of the X direction and the Y direction).

In one embodiment, the anti-aliasing sensor electrode 40 includes a geometry that provides for horizontal overlap in order to attenuate the spatial aliasing noise in the horizontal (X) direction, while providing for oversampling in the vertical (Y) direction.

One skilled in the art will recognize that certain design principles are common to the embodiments provided. For example, controlling or designing to provide a cross sectional area along one or more axes (i.e., a geometry of the sensor electrode) may provide certain benefits such as high or substantially high vertical (Y direction) and/or horizontal (X direction) resolution, reduction in spatial aliasing, reduction or elimination of spatial offset, and reduction or elimination of angular dependance (bias). Further benefits realized may include improved frequency response.

Accordingly, anti-aliasing sensor electrodes 40 are provided that incorporate an overlap. In typical embodiments, a "horizontal" dimension of each anti-aliasing sensor electrode 40 includes an overlap that is greater than a distance between the centers of adjacent electrodes. By making the apparent horizontal dimension (i.e., size) of each anti-aliasing sensor electrode 40 larger than a horizontal separation of a respective center for each anti-aliasing sensor electrode 40, the array 41 provides for a low pass filter of spatial frequency lower than one that would correspond to the spatial frequency given by the separation of the electrodes. Stated another way, the low pass filter may be realized if a relationship between the anti-aliasing sensor electrodes 40 exists where:

$$\left(\frac{1}{\text{horizontal\_size}}\right) < \left(\frac{1}{\text{horizontal\_separation}}\right). \quad (1)$$

In another embodiment, the low pass filter is realized if the array 41 accomplishes the spatial Nyquist criteria given in Eq. (2):

$$\left(\frac{1}{\text{horizontal\_size}}\right) < \left(\frac{2}{\text{horizontal\_separation}}\right). \quad (2)$$

This effect can be achieved in a variety of different ways as disclosed herein. One good example is the zig-zag shape shown in FIG. 5. The zig-zag shape is an example as it maintains the "vertical" coordinate of the all the electrodes at the same level, thus addressing a need for having more than one row of sensor electrodes. This shape also minimizes effects produced by features present in the formation when the instrument is oriented at specific angles.

Further, it is recognized that a computer program product may be used advantageously for designing sensor electrodes according to desired response properties. For example, a geometry may be used as a seed to the program and the program will iteratively adjust the geometry by balancing the desired response functions and performance goals for each respective function.

In support of the teachings herein, various analysis components including at least one of a digital system and an analog system, the system having components such as a computer, a processor, storage media, memory, input, output, communications link (wired, wireless, optical or other), user interfaces, software programs, signal processors (digital or analog) and other such components (such as resistors, capacitors, inductors and others) may be included to provide for operation and analyses of the apparatus and methods disclosed herein. It is considered that these teachings may be implemented in conjunction with a set of computer executable instructions stored on a computer readable medium, comprising ROM, RAM, CD ROM, flash or any other computer readable medium, now known or unknown, that when executed cause a computer to implement the method of the present invention. These instructions may provide for equipment operation, control, data collection and analysis and other functions deemed relevant by a system designer, owner, user or other such personnel.

Further, various other components may be included and called upon for providing for aspects of the teachings herein. For example, at least one power supply (e.g., at least one of a generator, a remote supply and a battery), sensor, electrode, transmitter, receiver, transceiver, controller, optical unit, electrical unit and electromechanical unit may be included in support of the various aspects discussed herein.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications may be made to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for designing a sensor electrode for incorporation in a resistivity imaging instrument, the sensor electrode for interrogating an earth formation, the method comprising:
   determining a geometry for the sensor electrode;
   evaluating a response function for resistivity measurements collected with the sensor electrode; and
   adjusting a geometry of the sensor electrode to improve the response function;
   wherein determining comprises selecting dimensions for the sensor electrode such that in an array of the sensor electrodes, (1/apparent horizontal dimension of the sensor electrode) is less than (2/horizontal separation of each sensor electrode of the array).

2. The method as in claim 1, wherein the response function comprises a response function for at least one of spatial aliasing, spatial offset, angular dependence, frequency response and resolution.

3. The method as in claim 1, wherein the geometry for the sensor electrode is one of a diamond shape, a one-row zigzag shape, a one-row double zigzag shape, a one-row triple zigzag shape and a one-row wavelet shape.

4. A computer program product stored on machine readable media, the product comprising machine executable instructions for designing a sensor electrode for incorporation in a resistivity imaging instrument, the sensor electrode for interrogating an earth formation, the instructions comprising instructions for:
   receiving an input geometry for the sensor electrode;
   evaluating at least one response function for the sensor electrode; and
   adjusting the input geometry for the sensor electrode according to desired response for each response function to create an adjusted geometry.

5. The computer program product as in claim 4, wherein the response function comprises a Nyquist criteria.

* * * * *